United States Patent [19]

Usubuchi et al.

[11] Patent Number: 4,820,021

[45] Date of Patent: Apr. 11, 1989

[54] LIGHT-SHIELDING SCREEN AND A PROCESS FOR PRODUCING THE SAME

[75] Inventors: Yutaka Usubuchi, Fuji; Masayoshi Mizuno, Mishima, both of Japan

[73] Assignee: Asahi Kasei Kogyo Kabushiki Kaisha, Osaka, Japan

[21] Appl. No.: 105,474

[22] Filed: Sep. 30, 1987

Related U.S. Application Data

[63] Continuation of Ser. No. 712,203, Mar. 15, 1985, abandoned.

[30] Foreign Application Priority Data

Mar. 19, 1984 [JP] Japan ................................ 59-51189

[51] Int. Cl.⁴ ........................................ G02B 27/00

[52] U.S. Cl. ................................ 350/276 R; 350/320

[58] Field of Search ............................ 350/276 R, 320

[56] References Cited

U.S. PATENT DOCUMENTS 2,053,173 9/1936 Astima .
4,506,953 3/1985 Shimizu et al. .

FOREIGN PATENT DOCUMENTS 0037529 3/1981 European Pat. Off. .
0114335 12/1983 European Pat. Off. .
2317642 4/1983 Fed. Rep. of Germany .
46-29525 8/1971 Japan .
52-14277 4/1977 Japan .
52-14278 4/1977 Japan .
53-78114 7/1978 Japan .
55-7562 2/1980 Japan .
55-139250 10/1980 Japan .
57-53703 3/1982 Japan .
57-89701 6/1982 Japan .
57-165802 10/1982 Japan .
57-18928 11/1982 Japan .
57-205950 12/1982 Japan .
58-215880 12/1983 Japan .
2042753 2/1980 United Kingdom .

*Primary Examiner*—John K. Corbin
*Assistant Examiner*—Rebecca D. Gass
*Attorney, Agent, or Firm*—Birch, Stewart, Kolasch & Birch

[57] ABSTRACT

A light-shielding screen comprising a light non-transmitting, photocured resin composition layer and a plurality of hollow portions having their respective upper and lower openings and passing through said composition layer, the hollow portions each having an inner wall extending from the circumference of each upper opening to the circumference of each lower opening substantially in parallel with the axis of said hollow portion. Such light-shielding screen is produced by image-wise exposing a layer of a photocurable resin composition to actinic radiation through an image-bearing transparancy to convert the layer to a modified layer having photocured portions and a plurality of uncured portions and then removing the uncured portions by means of a developer to form hollow portions passing through the modified layer and having their respective upper and lower openings. The present light-shielding screen can effectively shield extraneous light rays without deteriorating the image from an image-indicating device

13 Claims, 2 Drawing Sheets

LIGHT-SHIELDING SCREEN AND A PROCESS FOR PRODUCING THE SAME

This application is a continuation of application Ser. No. 712,203 filed on Mar. 15, 1985, now abandoned.

This invention relates to a light-shielding screen and a process for producing the same. More particularly, the present invention is concerned with a light-shielding screen which can be advantageously employed for extraneous light rays-shielding in various image-indicating devices such as television receivers, various displays having a CRT (cathode-ray tube) and related to computers, various indicators such as indicators for instruments, traffic signals and the like, and for shielding light rays in the unnecessary direction emitted from various image-indicating devices, thereby to adjust the visible angle range of the image from various image-indicating devices.

Extraneous light rays are often incident on the faces of various image-indicating devices and reflect therefrom, leading to the deterioration of an image projected. In order to prevent the deterioration of the projected image due to the reflection of extraneous light rays, various light-shielding screens have heretofore been proposed. For example, Japanese Patent Application Publication No. 55-7562 and U.S. Pat. No. 2,053,173 disclose a light-shielding screen comprising a plurality of transparent plastic layers, a plurality of light-reflecting layers and a plurality of light-shielding layers which are put on top of each other. Such light-shielding screens are produced by a process which comprises superimposing transparent layers, light-reflecting layers and light-shielding layers on top of each other to form a block consisting of laminated layers and slicing the resulting block at a predetermined angle, usually perpendicularly, relative to the laminated layers. Japanese Patent Application Laid-Open Specification No. 53-78114 discloses a light-shielding screen produced by a method which comprises piling up a plurality of transparent sticks each having a hexagonal cross section and having on its longitudinal side a light-absorbing or a light-reflecting layer to form a block and slicing in a predetermined thickness the resulting block perpendicularly relative to the longitudinal axis of the piled sticks.

However, in the above-mentioned conventional light-shielding screens, the width and thickness of the transparent layer and light-shielding layer are not uniform from part to part since in slicing the block to form a light-shielding screen the transparent layer and the light-shielding layer undergo deformation. The uneven width and thickness of the transparent layer and light-shielding layer lead to the uneven transmission of light emitted from an image-indicating device through the light-shielding screen, causing the image through the light-shielding screen to be obscured.

On the other had, light-shielding screens having fine structures produced from a photocurable resin have been proposed in, for example, Japanese Patent Application Laid-Open Specification Nos. 55-139250/1980, 5789701/1982, 57-165802/1982 and 57-189128/1982 and European Patent Application Laid-Open Specification No. 0066745. The light-shielding screens disclosed in the above-mentioned patent application laid-open specifications are produced as follows. A photocurable resin composition layer is provided on a substrate such as a transparent resin plate or a transparent glass plate by the method in which a photocurable resin composition is applied to the surface of the substrate or the method in which a sheet of a photocurable resin composition is adhered to the substrate. The photocurable resin composition layer is image-wise exposed to actinic ray irradiation through an image-bearing transparency having transparent portions and opaque portions which constitute a negative image of a predetermined pattern comprising a plurality of lines arranged at spaced intervals, thereby to convert the photocurable resin composition layer to a modified layer having cured image portions and remaining uncured portions. The uncured portions are removed by means of a developer, thereby forming a plurality of relief lines corresponding to the plurality of lines of the negative image. Then, the relief line portions are dyed. Thus, there is produced a light-shielding screen comprising a transparent plate and a light non-transmitting dyed relief lines of a photocured resin composition and supported by the transparent plate. However, in the above-mentioned method of producing a light-shielding screen, the removal of the uncured portions from the modified layer is effected with the support attached to one side of the modified layer. Therefore, difficulties are encountered to sufficiently remove the uncured portions by means of a developer, and a part of the uncured portions remains unremoved at the corner where the relief portions and the substrate meet. Particularly, in the case of a light-shielding screen in which the relief lines formed on the substrate cooperate with one another to form a striped or a lattice pattern, the narrower the intervals of the relief lines and the higher the relief lines, the more the amount of the uncured portions remaining unremoved. When the light-shielding screen in which the uncured photocurable resin remains unremoved at the corner where the relief portions and the substrate meet is used for extraneous light rays-shielding in image-indicating devices or for adjusting the visible angle range of the image from image-indicating devices, the image through the light-shielding screen is a distorted one and/or an obscured one.

It is possible to sufficiently remove the uncured photocurable resin by the method in which in the step of removing the uncured photocurable resin the developer is sprayed at a high pressure or the method in which the corner at which the uncured photocurable resin have remained unremoved is subjected to a strong brushing treatment by means of a developer-bearing brush. However, in these methods, the relief lines tend to be deformed or damaged. Therefore, the resulting light-shielding screens are poor in extraneous light rays-shielding performance.

When in a light-shielding screen, the ratio of the intervals of the relief lines to the height of the relief lines are limited to a low value, e.g., 1:1.5 or less, in the step of producing it, the uncured photocurable resin can be sufficiently removed without deformation or damage of the relief lines. However, the light-shielding screen in which the ratio of the intervals of the relief lines to the height of the relief lines is low, e.g., 1:1.5 or less, is poor in extraneous light rays-shielding performance and, hence, such light-shielding screen cannot be used for applications where a high extraneous light rays-shielding performance is required.

As is apparent from the foregoing, the conventional light-shielding screens have a large room for improvement in respect of the quality of the image through the light-shielding screen and the extraneous light rays-shielding performance.

The present inventors have made extensive and intensive studies with a view to eliminating the above-mentioned drawbacks of the conventional light-shielding screens and to providing a light-shielding screen which is not only excellent in the extraneous light rays-shielding performance but also does not deteriorate the image emitted from image-indicating devices. As a result, the present inventors have found that an excellent extraneous light rays-shielding effect can be achieved without the deterioration of an image emitted from an image-indicating device by using a light-shielding screen comprising a light non-transmitting, photocured resin composition layer and a plurality of hollow portions having their respective upper and lower openings and passing through said composition layer, each of said hollow portion having an inner wall extending from the circumference of each upper opening to the circumference of each lower opening substantially in parallel with the axis of said hollow portion.

Based on such a novel finding the present invention has been made.

Accordingly, it is an object of the present invention to provide a light-shielding screen which is not only excellent in the extraneous light rays-shielding performance but also does not deteriorate the image emitted from image-indicating devices.

It is another object of the present invention to provide a process for producing a light-shielding screen of the kind described above.

The foregoing and other objects, features and advantages of the present invention will be apparent from the following description taken in connection with the accompanying drawings in which.

Figure 4:
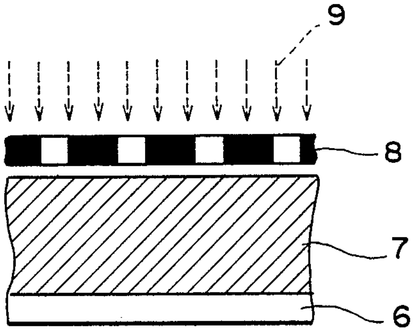
Figure 5:
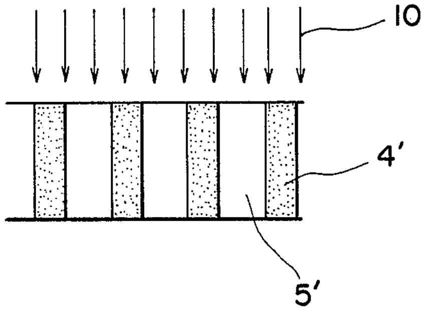

FIG. 4 is a schematic view illustrating the step of image-wise exposing a photocurable resin composition layer to actinic radiation through an image-bearing transparency to convert the photocurable resin composition layer to a modified layer having photocured image portions and a plurality of remaining uncured portions according to one mode of the process of the present invention; and FIG. 5 is a schematic view illustrating the step of applying a developer to the modified layer formed in the step illustrated in FIG. 4 to form hollow portions passing through the modified layer.

In FIGS. 1 to 5, like portions or parts are designated by like numerals.

In one aspect of the present invention, there is provided a light-shielding screen comprising:

a light non-transmitting, photocured resin composition layer; and a plurality of hollow portions passing through said resin composition layer, said resin composition layer cooperating with said hollow portions to form a perforated structure, said hollow portions having their respective upper and lower openings, said upper openings being arranged in coplanar relationship on one surface of said resin composition layer and said lower openings being arranged in coplanar relationship on the other surface of said resin composition layer, each of said hollow portions having an inner wall extending from the circumference of each upper opening to the circumference of each lower opening substantially in parallel with the axis of said hollow portions, said axis being defined by an imaginary straight line extending from the center of each upper opening to the center of each lower opening.

The light-shielding screen of the present invention comprises a light non-transmitting, photocured resin composition layer and a plurality of hollow portions passing through the resin composition layer. The resin composition layer cooperates with the hollow portions to form a perforated structure. The hollow portions have their respective upper and lower free openings. The upper free openings are arranged in coplanar relationship on one surface of the resin composition layer and the lower free openings are arranged in coplanar relationship on the other surface of the resin composition layer. Each of the hollow portions has an inner wall extending from the circumference of each upper opening to the circumference of each lower opening substantially in parallel with the axis of the hollow portions. The axis is defined by an imagiary straight line extending from the center of each upper opening to the center of each lower opening.

Figure 1:
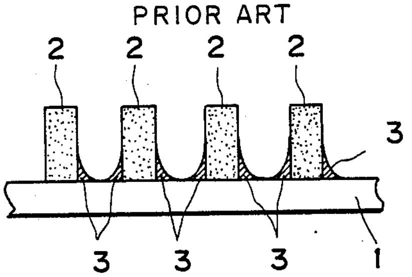
FIG. 1 PRIOR ART
FIG. 1 is a cross-sectional view of a conventional light-shielding screen.

Referring now to FIG. 1, there is shown a vertical cross-sectional view of a conventional light-shielding screen, in which numeral 1 designates a substrate, numeral 2 a relief of a photocured resin composition and numeral 3 an uncured photocurable resin composition remaining unremoved.

Figure 2:
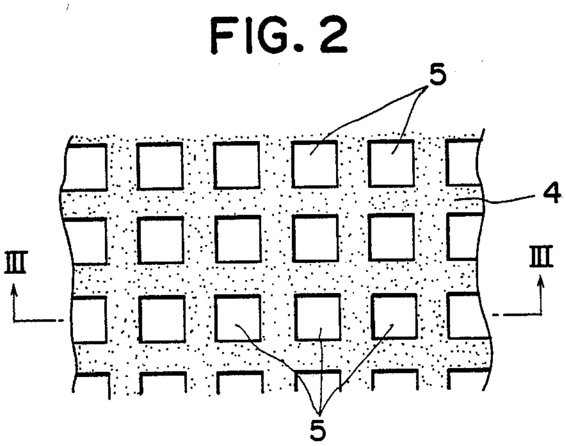
FIG. 2 is a front view of one form of a light-shielding screen according to the present invention.

In FIG. 2 is shown a plan view of one form of a light-shielding screen according to the present invention, which comprises a light non-transmitting, photocured resin composition layer 4 and hollow portions 5 having a square opening. In the present invention, the light non-transmitting, photocured resin composition layer cooperates with a plurality of hollow portions 5, thereby to form a preferred structure consisting of hollow portions 5 and solid photocured resin portions 4. The solid photocured resin portions 4 are in an interconnected form.

Figure 3:
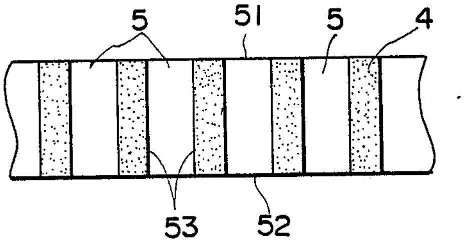
FIG. 3 is a cross-sectional view taken on the line III—III of FIG. 2.

In FIG. 3 is shown a cross-sectional view taken on the line III—III of FIG. 2, in which numeral 4 designates a light non-transmitting, photocured resin composition layer and numeral 5 hollow portions. The hollow portions 5 have their respective upper openings 51 and lower openings 52. The upper openings 51 are arranged in coplanar relationship on one surface of the resin composition layer and the lower openings 52 are arranged in coplanar relationship on the other surface of the resin composition layer. The inner wall 53 of each of said hollow portions 5 extends from the circumference of each upper opening 51 to the circumference of each lower opening 52 substantially in parallel with the axis (an imaginary straight line) of said hollow portion 5.

The shape of the upper and lower openings is not particularly critical, and the upper and lower openings (hereinafter often referred to simply as "openings") may have any shape. For example, the shape of the openings may have any one of the shapes of openings disclosed in Japanese Patent Application Laid-Open Specification Nos. 53-78114, 57-53703, 57-165802 and 57-205950, and may be circular, oval, triangular, square, rectangular, rhombic, parallelogrammic or honeycomb (hexagonal). Generally, the shape of the openings is circular, square, rectangular or hexagonal.

The widths of the openings are not critical and may vary depending on the use of the light-shielding screen. However, in general, the widths of the openings are in the range of 0.01 to 3 mm. The term "width of opening" as used herein is intended to mean: the diameter in the case of a circular opening; the length of the minor axis in the case of an oval opening; in the case of a polygonal opening having sides in odd numbers, the minimum distance between the vertexes and the sides opposite to the vertexes; and in the case of a polygonal opening having sides in even numbers, the minimum distance between the opposite sides.

The minimum distance between the circumferences of the nearest adjacent openings and the thickness of the photocured resin composition layer are not critical and may vary according to the use of the light-shielding screen. Generally, however, the minimum distance between the circumferences of the nearest adjacent openings and the thickness of the photocured resin composition layer may be 0.005 to 0.5 mm and 0.05 to 6 mm, respectively.

In order to control light-shielding characteristics, the ratio of the width of the opening to the thickness of the photocured resin composition layer may be varied. Such ratio is not critical but may generally be varied from 1:0.2 to 1:5, preferably 1:0.6 to 1:5 according to use.

In the present invention, it is preferred that the surface of the modified layer, at least the inner wall of each of the hollow portions have a surface roughened. The roughened surface of the modified layer, especially, the inner wall of each of the hollow portions serves to not only scatter extraneous light rays but also scatter light rays emitted from the image-indicating device and striking the modified layer, thereby to prevent the reflection thereof. To form such a roughened surface of the modified layer, it is preferred that the photocured resin composition contain 0.1 to 20%, more preferably 0.5 to 10% by weight of a delustering agent based on the photocured resin composition. The term "delustering agent" as used herein is intended to mean a finely divided solid (which will be described later) which can be dispersed uniformly into a photocurable resin composition (which will be described later) without undergoing any chemical or physical change such as chemical reaction or dissolution.

According to the present invention, a further improved light-shielding effect of the light-shielding screen can be attained by adopting a colored surface of the modified layer, at least a colored surface of the inner wall of each of the hollow portions. Dyes and pigments which may be used and methods for coloring the surface of the modified layer and the surface of the inner wall be described later.

In the present invention, the photocured resin composition is preferably one obtained by photocuring a photopolymerizable resin composition which will be mentioned later.

In another aspect of the present invention, there is provided a process for producing a light-shielding screen which comprises:

(a) providing a photocurable resin composition layer;

(b) image-wise exposing the photocurable resin composition layer to actinic radiation through an image-bearing transparency to convert the photocurable resin composition layer to a modified layer having photocured image portions and a plurality of remaining uncured portions, each of said uncured portions extending from one surface of the layer to the other surface of the layer; and (c) applying a developer to said modified layer to remove said uncured portions, thereby forming hollow portions passing through said modified layer, said hollow portions having their respective upper and lower openings, said upper openings being arranged in coplanar relationship on one surface of said modified layer and said lower openings being arranged in coplanar relationship on the other surface of said modified layer.

As a preferred example of the photocurable resin composition to be used in the present invention, there may generally be mentioned a composition comprising a compound having an additional polymerizable ethylenically unsaturated group and a photopolymerization initiator. The compound may be at least one member selected from the group consisting of prepolymers and monomers. The composition may optionally contain a heat polymerization inhibitor. As examples of the prepolymer, there may generally be mentioned polymerization products such as unsaturated polyesters, alkyd resins, unsaturated polyurethanes, oligomers of an ester-acrylate type, unsaturated poly(meth)acrylates and various rubbers having a C-C bond. In the present invention, the prepolymers may preferably have a number average molecular weight of 500 to 100,000.

More illustrative examples of the above-mentioned prepolymers will be given below:

(1) unsaturated polyesters prepared from at least one unsaturated dicarboxylic acid such as maleic acid, fumaric acid or itaconic acid, and/or its anhydride, and at least one polyhydric alcohol such as ethylene glycol, propylene glycol, diethylene glycol, triethylene glycol, glycerin, trimethylolpropane, pentaerythritol, 1,4-polybutadiene having terminal hydroxyl groups, hydrogenated or non-hydrogenated 1,2-polybutadiene having terminal hydroxyl groups, butadiene-styrene copolymer having terminal hydroxyl groups or butadiene-acrylonitrile copolymer having terminal hydroxyl groups; and unsaturated polyesters prepared from at least one unsaturated dicarboxylic acid or its anhydride as mentioned above, at least one polyhydric alcohol as mentioned above, and at least one saturated polycarboxylic acid or its anhydride such as succinic acid, adipic acid, phthalic acid, isophthalic acid, phthalic anhydride, trimellitic acid or trimellitic acid anhydride;

(2) alkyd resins prepared by modifying the above-mentioned unsaturated polyesters with at least one drying oil and/or at least one semidrying oil;

(3) unsaturated polyurethanes having addition-polymerizable unsaturated groups introduced by utilizing terminal isocyanate and/or hydroxyl groups of polyurethanes derived from at least one polyol having two or more terminal hydroxyl groups and at least one polyisocyanate, for example, unsaturated polyurethanes which are prepared from (i) a polyurethane having terminal isocyanate and/or hydroxyl groups and prepared from at least one polyol such as a polyhydric alcohol as mentioned above, polyester polyol or polyether polyol and at least one polyisocyanate such as tolylene diisocyanate, diphenylmethane-4,4'-diisocyanate or hexamethylene diisocyanate and (ii) at least one unsaturated mono- or di-carboxylic acid as mentioned above or its ester or polyester having active hydrogen atoms derived from hydroxyl (reactive with the terminal isocyanate) and/or carboxyl (reactive with both of the terminal isocyanate and the terminal hydroxyl) and/or amino groups (reactive with the terminal isocyanate), and unsaturated polyurethanes obtained by linking two or more molecules of an unsaturated polyester as mentioned above with a polyisocyanate; and (4) oligomers of an ester-acrylate type obtained by the co-condensation of an esterification reaction system composed of a polycarboxylic acid or its anhydride and a polyhydric alcohol with acrylic acid and/or methacrylic acid and having a number average molecular weight of about 200 to about 5,000, said number average molecular weight being controlled by choosing an appropriate molar ratio of the raw materials, examples of said polycarboxylic acid or its anhydride being adipic acid, isophthalic acid, phthalic acid and phthalic anhydride, examples of said polyhydric alcohol being ethylene glycol, propylene glycol, diethylene glycol, triethylene glycol, glycerin, trimethylolpropane and pentaerythritol; epoxyacrylates, for example, esters of acrylic acid or methacrylic acid and a compound having epoxy groups obtained by condensation polymerization of a polyhydric alcohol or polyhydric phenol with epichlorohydrin or an alkylene oxide; and polymers having, in its side chains, carbon-carbon double bonds capable of taking an active part in the addition polymerization reaction, for example, polymers obtained by reacting an unsaturated carboxylic acid or its anhydride with a polymer having hydroxyl groups such as polyvinyl alcohol or cellulose, polymers obtained by esterifying a homopolymer or copolymer of acrylic acid or methacrylic acid having carboxyl groups with an unsaturated alcohol such as allyl alcohol, glycidyl acrylate or glycidyl methacrylate, polymers obtained by reacting a copolymer containing maleic anhydride monomer units with allyl alcohol, a hydroxyalkyl acrylate and/or a hydroxyalkyl methacrylate, and polymers obtained by reacting a copolymer having glycidyl acrylate and/or glycidyl methacrylate monomer units with acrylic acid and/or methacrylic acid. As the suitable rubber, there may be mentioned, for example, a member (I) selected from the group consisting of 1,4-polybutadiene, 1,2-polybutadiene, a copolymer of butadiene and styrene, a copolymer of butadiene and acrylonitrile and an EPDM; a member (II) selected from the group consisting of a copolymer obtained by hydrogenating the member (I), a copolymer of isobutylene and isoprene and a copolymer of ethylene and propylene; and a modified rubber having an ethylenically unsaturated group which may be obtained by incorporating the ethylenically unsaturated group into the above-mentioned member (I) and member (II).

As stated above, the member (I) per se and also the modified rubber obtained by incorporating an ethylenically unsaturated group into the member (I) may be suitably employed in the present invention. In the case where the latter polymer is employed, incorporation of an ethylenically unsaturated group into the member (I) may be effectively carried out by using a rubber of varied kind having a functional group at its chain terminal. On the other hand, in the case of a rubber having a 1,2-polybutadiene segment, incorporation of an ethylenically unsaturated group thereinto may be readily effected by utilizing an addition reaction of maleic anhydride or the like to the 1,2-polybutadiene segment.

Moreover, ethylenically unsaturated polyamides, ethylenically unsaturated polyimides and ethylenically unsaturated polyethers may be used as the suitable prepolymer in the present invention.

Prepolymers other than those set forth above may also be suitably employed in the present invention. As such other prepolymers, there may be mentioned, for example, prepolymers having no ethylenically unsaturated group which is capable of photocuring through the mechanism otherthan that in which an addition reaction occurs between ethylenically unsaturated double bonds. Examples of such prepolymers include a water-soluble nylon, polyvinyl alcohol and derivatives thereof.

As the ethylenically unsaturated monomer which may be used in the photopolymerizable resin composition, there may be mentioned commonly known ethylenically unsaturated monomers as follows:

(1) unsaturated carboxylic acids such as acrylic acid and methacrylic acid, or esters thereof, for example, alkyl acrylate, alkyl methacrylate, cycloalkyl acrylate, cycloalkyl methacrylate, alkyl halide acrylate, alkyl halide methacrylate, alcoxyalkyl acrylate, alcoxyalkyl methacrylate, hydroxyalkyl acrylate, hydroxyalkyl methacrylate, aminoalkyl acrylate, aminoalkyl methacrylate, tetrahyrofurfuryl acrylate, tetrahydrofurfuryl methacrylate, allyl acrylate, allyl methacrylate, glycidyl acrylate, glycidyl methacrylate, benzyl acrylate, benzyl methacrylate, phenoxy acrylate, phenoxy methacrylate, mono- or di-acrylate of alkylene glycol, mono- or di-methacrylate of alkylene glycol, mono- or di-acrylate of polyoxyalkylene glycol, mono- or di-methacrylate of polyoxyalkylene, trimethylolpropane triacrylate, trimethylolpropane trimethacrylate, pentaerythritol tetraacrylate, pentadrythritol tetramethacrylate;

(2) acrylamides and methacrylamides, or derivatives thereof, for example, an acrylamide N-substituted with an alkyl or hydroxyalkyl group, a methacrylamide N-substituted with an alkyl or hydroxyalkyl group, an acrylamide N,N'-disubstituted with alkyl and/or hydroxyalkyl groups, a methacrylamide N,N'-disubstituted with alkyl and/or hydroxyalkyl groups, diacetone acrylamide, diacetone methacrylamide, N,N'-alkylene-bis-acrylamide, and N,N'-alkylene-bismethacrylamide;

(3) allyl compounds such as allyl alcohol, allyl isocyanate, diallyl phthalate and triallyl cyanurate;

(4) maleic acid, maleic anhydride and fumaric acid, and esters thereof, for example, mono- or di-alkyl maleate, mono- or di-alkyl fumarate, mono- or di-haloalkyl maleate, mono- or di-haloalkyl fumarate, mono- or di-alkoxyalkyl maleate, mono- or di-alkoxyalkyl fumarate; and (5) other unsaturated compounds such as styrene, vinyltoluene, divinylbenzene, N-vinylcarbazole and N-vinylpyrrolidone. They may be used either alone or in combination. When they are employed in combination, an azide compound may be incorporated into the ethylenically unsaturated monomers. As such as azide compound, there may be mentioned 4,4'-diazidostilbene, p-phenylenebisazido, 4,4'-diazidobenzophenone, 4,4'-diazidodiphenylmethane, 4,4'-diazidochalcone, 2,6-di(4'-azidobenzal)-cyclohexanone, 4,4'-diazidostilbene-α-carboxylic acid, 4,4'-diazidodiphenyl, disodium salt of 4,4'-diazidostilbene-2,2'-disulfonic acid and the like. The amount of the ethylenically unsaturated monomer which may be optionally incorporated into the above-mentioned prepolymer may usually be 200 parts or less by weight per 100 parts by weight of the prepolymer.

Various photopolymerization initiators as commonly used can be added to the photocurable resin composition to be employed in the present invention. Specific examples of such initiators include benzoin, benzoin alkyl ethers such as benzoin ethyl ether, benzoin n-propyl ether, benzoin isopropyl ether and benzoin isobutyl ether, 2,2-dimethoxy-2-phenylacetophenone, benzophenone, benzil, diacetyl, diphenyl sulfide, eosin, thionine, 9,10-anthraquinone, 2-ethyl-9,10-anthraquinone, Michler's ketone [4,4'-bis-(dimethylamino)benzophenone] and the like. They may be used either alone or in combination. The amount of any photopolymerization initiator is such as will be effective for polymerization, i.e., 0.001 to 10% by weight based on the photocurable resin composition.

As the heat-polymerization inhibitor optionally added to the photocurable resin composition to be employed in the present invention, there may be mentioned, for example, hydroquinone, tert-butylhydroquinone, benzoquinone, 2,5-diphenyl-p-benzoquinone, picric acid, di-p-fluorophenylamine, p-methoxyphenol, 2,6-di-tert-butyl-p-cresol and the like. They may be used either alone or in combination. Such heat-polymerization inhibitors are added in the expectation of preventing het-polymerization reactions (reactions in the darkness). Accordingly, the amount of any heat-polymerization inhibitor is such as will be effective for inhibiting heat-polymerization, i.e., 0.005 to 5.0% by weight based on the prepolymer or the total weight of the prepolymer and the ethylenically unsaturated monomer. Photocurable compositions other than those mentioned above, for example, a composition comprising polyethylene, polythiol and a photopolymerization initiator as disclosed in Japanese Patent Application Publication No. 46-29525/1971 may also be employed in the present invention. Moreover, as the photocurable composition other than those mentioned above which may be employed in the present invention, there may be mentioned, for example, diazo-type photocurable resin compositions such as a diazo resin composition comprising an aromatic diazonium compound as its major constituent and a composition comprising a diazide compound and a rubber, photocurable resin compositions comprising cinnamic esters and photocurable resin compositions as disclosed as disclosed in Japanese Patent Application Publications No. 52-14277/1977 and No. 52-14278/1977 which each comprise a compound capable of releasing a Lewis acid by action of light and an oxirane-containing compound.

In the present invention, roughening of the relief portions (photocured resin portions), especially the side surfaces thereof, constituting the photocured resin composition layer (modified layer) of the light-shielding screen according to the present invention thereby to decrease the reflectance of light rays from the relief portions is effective in preventing the ghost phenomenon and light leakage. The above-mentioned roughening of the relief portions may be advantageously attained by adding a delustering agent to the photocurable resin composition.

As the delustering agent to be employed in the present invention, there may be mentioned, for example, titanium oxide, mica, calcium carbonate, a powdered glass such as Glass Pearl having a particle diameter of 5 to 15μ (trade name of a product manufactured and sold by Kyoritsu Ceramics Co., Ltd., Japan), a finely divided silica such as Syloid having a particle diameter of 0.5 to 20μ (trade name of a product manufactured and sold by Fuji Davison Chemical Co., Ltd., Japan) and Aerosil having a particle diameter of 0.5 to 20μ (trade name of a product manufactured and sold by Nippon Aerosil Co., Ltd., Japan), aluminum powder, a powdered clay and the like. The amount of the delustering agent to be added to the photocurable resin composition in the present invention may generally be in the range of 0.1 to 20% by weight, preferably 0.5 to 10% by weight based on the photocurable resin composition. In general, in case the amount of the delustering agent is less than 0.1% by weight based on the photocurable resin composition, an effect for reflecting extraneous light rays is not sufficient. Whereas, in case the amount of the delustering agent is more than 20.0% by weight based on the photocurable resin composition, the surface-roughening effect is not proportionally increased but the transparency of the photocurable resin composition is rather lowered, thereby causing the ultimate relief portions constituting the photocured resin composition layer to exhibit a decreased resolution due to the scattering of light rays. The suitable amount of the delustering agent to be added may be determined on the basis of its side surface roughening effect for the ultimate relief portions. For example, it is preferred that the delustering agent be added to the photocurable resin composition in an amount such that the reflectance as measured according to the method described in Japanese Patent Application Laid-Open Specification No. 57-189439/1982 (corresponding to U.S. patent application Ser. No. 378,813) becomes 20% or less. Of the above-mentioned delustering agents, a finely divided silica is most preferred from the standpoint of good dispersion, good refractive index and the like.

A detailed explanation of the process of the present invention for producing the above light-shielding screen will now be given. Referring to FIG. 4, first, a photocurable resin composition is applied upon one flat surface of a substrate 6 at a predetermined thickness to provide a photocurable resin composition layer 7 on the substrate. Alternatively, a sheet composed of a photocurable resin composition may be superimposed on a substrate 6 while ensuring close contact therebetween to provide a photocurable resin composition layer 7 on the substrate. Then, a transparency 8 having a predetermined image is superimposed on the photocurable resin composition layer 7. Next, the photocurable resin composition layer 7 is irradiated through the image-bearing transparency 8 with an actinic light 9 selected from the solar light and the lights emitted from an arc lamp, a mercury lamp, a xenon lamp, an ultraviolet fluorescent lamp and the like to convert the photocurable resin composition layer 7 to a modified layer having photocured image portions and a plurality of remaining uncured portions. After the irradiation with the actinic light, the image-bearing transparency 8 and substrate 6 are removed. Thereafter, referring to FIG. 5, the unexposed, thus uncured portions of the modified layer (photocured resin composition layer) 4' are washed away with a developer 10, thereby forming hollow portions 5' passing through the modified layer 4'. The hollow portions 5' have their respective upper and lower openings, said upper openings being arranged in coplanar relationship on one surface of the modified layer and said lower openings being arranged in coplanar relationship on the other surface of the modified layer 4'.

As the substrate 6 which may be used in the present invention, there may be employed any substrate made of a material capable of being stripped off the photocured resin composition layer. The form of the substrate is not critical but a substrate in the form of film or sheet may preferably be employed. As suitable examples of the substrate, there may be mentioned, for example, films or sheets made of glass or synthetic resins such as polymethyl methacrylate, polystyrene, polyvinyl chloride, polycarbonate, polypropylene, polyethylene terephthalate, acetylcellulose, polyacrylonitrile, polyamide, polyvinyl alcohol and the like. These may also be employed metal sheets such as an aluminum sheet and steel sheet. In the present invention, in order to facilitate the separation of the photocured resin composition layer from the substrate, there may be applied to the surface of the substrate a releasing agent such as a silicon resin type releasing agent and a fluoroplastic type releasing agent.

Whether the photocurable resin composition as liquid or solid, when the photocurable resin composition which may be employed is tacky, it is preferred that an interlayer film be provided between the image-bearing transparency 8 and the layer of the photocurable resin composition 7 from the standpoint of protection of the image-bearing transparency and prevention of adhesion between the layer of the photocurable resin composition and the image-bearing transparency. Examples of the interlayer film include a transparent film such as polyethylene film, polypropylene film, polycarbonate film, polyamide film, polyester film, acetyl cellulose film, polyvinyl alcohol film and cellophane.

In the present invention, as mentioned above, the provision of a photocurable resin composition layer may be effected by superimposing the photocurable resin composition layer on a substrate, and the substrate may be removed after exposing the photocurable resin composition layer to actinic radiation, i.e., after step (b), and before applying a developer to the resulting modified layer to remove the uncured portions, i.e., before step (c). Alternatively, in the present invention, the modified layer may be subjected to the application of the developer with the substrate attached to the modified layer and the substrate may be washed away by the developer together with the uncured portions of the modified layer. In this case, when water is used as the developer, a polyvinyl alcohol substrate (water-soluble substrate) may be used as a suitable substrate. When an organic solvent such as trichloroethane is used as the developer, a polystyrene substrate may be used as a suitable substrate. When dimethylsulfoxide is used as the developer, a polyacrylonitrile substrate may be used as a suitable substrate.

When the photocurable resin composition is self-supporting, the light-shielding screen may be prepared without using a substrate in the following manner. A photocurable resin plate without any substrate is subjected to exposure to actinic radiation through an image-bearing transparency. The unexposed portions of the photocurable resin plate are removed using a developer. In this case, as the photocurable resin plate, there may be employed a plate which is obtained by (i) incorporating a binder polymer into any one of the aforementioned photocurable resin composition and (ii) subjecting the resulting resin composition to press molding. As the binder polymer to be used in obtaining a photocurable resin plate, there may be mentioned, for example, a polyamide, a polyvinyl alcohol, a thermoplastic rubber, a butadiene-styrene block copolymer, a polybutadiene, etc. The binder polymer may be incorporated into the resin composition in an amount of 10 to 80% by weight based on the total amount of the resulting plate. As the photocurable resin plate, there may also be used a plate made of prepolymer of unsaturated polyamide, unsaturated polyimide or unsaturated polymethacrylate.

According to the present invention, in removing the uncured portions of the modified layer, as mentioned above, there is no substrate attached to the modified layer, or the substrate may also be washed away together with the uncured portions. Therefore, the uncured portions of the modified layer are easily washed away by a developer to form a plurality of hollow portions running from one side of the layer to the other side of the layer. Consequently, the uncured photocurable resin composition does not remain unremoved in the hollow portions. Therefore, a strong brushing to remove uncured photocurable resin composition is not required, so that deformation and damage of the photocured resin composition layer hardly occurred. Moreover, the removal of the uncured portions can be performed from not only one side of the layer but also the other side of the layer. Further, the removal of the uncured portions can be effectively performed from both sides of the photocured resin composition layer simultaneously.

The uncured portions may be removed by various conventional methods using a developer. For example, the uncured portions may be removed, for example, by spraying a developer on the modified layer having photocured image portions and a plurality of remaining uncured portions to wash away the uncured portions; by a brushing method in which the modified layer is brushed with a developer-bearing brush, a sonication method in which the modified layer is subjected to sonication in a developing solution; a blowing method in which air is blown upon the modified layer; a sucking method in which one side of the modified layer is evacuated to cause pressure difference between one side of the modified layer and the other side of the modified layer so that the uncured resin composition is removed by the air flow caused by the pressure difference; or combined methods of the above-mentioned methods.

The term "developer" used herein is intended to mean a liquid developer and air. As the liquid developer to be used in the present invention, there may be mentioned, for example, water, an alkaline solution such as aqueous sodium hydroxide solution, aqueous sodium carbonate solution, aqueous sodium borate solution, aqueous sodium silicate solution, aqueous sodium phosphate solution and aqueous sodium aluminate solution, an aqueous solution of a surface active agent, and various organic solvents such as alcohol, 1,1,1-trichloroethane, tetrachloroethylene, trichloroethylene, tetrachloroethane, toluene and mixtures thereof.

In the present invention, it is necessary that the photocured resin composition layer does not transmit light. The photocured resin composition layer which does not transmit light may be obtained by dyeing the photocured resin composition layer with a dye after removing the uncured portions from the modified layer. Alternatively, a dye or pigment may be incorporated into the photocurable resin composition in advance and subjected to exposure and development. In this case, it is necessary to incorporate a dye or pigment into the resin composition in such an amount that the photosensitivity of the photocurable resin composition is not remarkably decreased.

As the dye to be used in the present invention, there may be mentioned a cationic dye such as "Diacryl Black KSL-N" (trade name of a cationic dye produced and sold by Mitsubishi Chemical Industries Limited, Japan), "Kayacryl Black NP" or "Kayacryl Black NL" (trade name of a cationic dye produced and sold by Nippon Kayaku Co., Ltd., Japan); a disperse dye such as "Diacelliton Black B" (trade name of a disperse dye produced and sold by Mitsubishi Chemical Industries Limited, Japan), "Kayalon Polyesten Black S-200" or "Kayalon Polyesten Black T" (trade name of a disperse dye produced and sold by Nippon Kayaku Co., Ltd.); an acid dye such as "Kayanol Milling Black TLB" (trade name of an acid dye produced and sold by Nippon Kayaku Co., Ltd., Japan) or "Suminol Milling Black VLG" (trade name of an acid dye produced and sold by Sumitomo Chemical Company Ltd., Japan); a metallized dye such as "Kayakalan Blue Black RL" (trade name of a metallized dye produced and sold by Nippon Kayaku Co., Ltd., Japan), "Lamyl Black BGL" or "Sumilan Black WA" (trade name of a metallized dye produced and sold by Sumitomo Chemical Company Ltd., Japan); a reactive dye such as "Sumifix Black E-NS" (trade name of a reactive dye produced and sold by Sumitomo Chemical Company Ltd., Japan); a direct dye and the like. Of them, a disperse dye and a metallized dye are peferred from the standpoint of the weather resistance. The kind of dye to be used may be chosen based on the compatibility with the photocurable resin composition to be dyed and on the absorption characteristics of the dye.

As the pigment to be used in the present invention, there may be mentioned inorganic and organic pigments. Of them a pigment having good dispersion properties in the photocurable resin composition is preferred.

The light-shielding screen of the present invention may be applied in the form as it is. Alternatively, it may be applied in the form of a multi-layer structure in which a transparent plate of a resin, glass or the like is attached to a flat surface of the screen, or in which such transparent plates are attached to both flat surfaces of the screen. Moreover, a light-shielding screen having a curved surface may be easily obtained by the use of any cured transparent plate.

As described in the foregoing, the light-shielding screen of the present invention can effectively shield extraneous light rays without deteriorating the image from an image-indicating device and, hence, can be advantageously used not only for shielding extraneous light rays in various image-indicating devices but also for adjusting the visible angle range of the image from various image-indicating devices.

The present invention will be illustrated in more detail with reference to the following Examples, which should not be construed to be limiting the scope of the present invention. The parts are by weight, unless otherwise indicated.

EXAMPLE 1

100 parts of an unsaturated polyester resin having an acid value of 30 mg KOH/g prepared by effecting condensation polymerization of a mixture of propylene glycol, diethylene glycol, adipic acid, fumaric acid and isophthalic acid at a molar ratio of 0.12/0.38/0.24/0.14/0.12, 12 parts of diethylene glycol dimethyacrylate, 30 parts of tetraethylene glycol dimethacrylate, 12 parts of 2-hydroxyethyl methacrylate, 6 parts of diacetone acrylamide, 2 parts of benzoin isobutyl ether and 0.03 part of 4-tert-butyl catechol were mixed to obtain a photocurable resin composition. To the so obtained photocurable resin composition was added 5% by weight of a finely divided silica as a delustering agent to obtain a photocurable resin composition containing a delustering agent.

Then, about 50 g of the photocurable resin composition containing a delustering agent was poured onto a 10μ-thick polyester film superimposed on a lattice-pattern negative film of 100μ in thickness having 50μ-wide transparent portions and square opaque portions of 200μ in side length which negative film had been supported by a 10 mm-thick transparent glass plate. Onto the photocurable resin composition was placed a 3 mm-thick, 30 cm-wide and 30 cm-long transparent glass plate to be contacted with the photocurable resin composition, and the thickness of the photocurable resin composition layer was adjusted to 500μ with the use of a spacer of the same thickness. The resulting laminate assembly was exposed for about 80 seconds from the side of the negative film to actinic rays from a 3 KW ultra-high pressure mercury lamp placed at a distance of 50 cm from the surface of the laminate assembly, thereby causing the photocurable resin composition to be photocured in the lattice pattern. Thereafter, the glass plate supporting the negative film, the negative film, the polyester film and the other glass plate were stripped off. Over each surface of the resin composition layer was sprayed a weakly alkaline solution (a 1% aqueous solution of sodium borate) heated to 50° C. from a nozzle placed at a distance of about 1 cm from the resin composition layer at a discharge pressure of 0.8 kg/cm$^2$-gauge and a discharge rate of about 20 liters/minute to wash away the non-exposed, uncured areas of the resin layer for 90 seconds with respect to each surface. Thus, a photorelief plate was obtained. The so-obtained photorelief plate was rinsed with water, post-irradiated at an amount of light of 1,000 mJ/cm$^2$ for 10 minutes, dried at 50° C. for 10 minutes, and immersed in a 60° C. bath containing 0.5% by weight of a metallized dye (Kayakalon Blue Black BL, produced and sold by Nippon Kayaku Co., Ltd., Japan) for 30 minutes to dye the photorelief. Further,the dyed photorelief plate was rinsed with water and dried at 50° C. for 10 minutes to obtain a light-shielding screen as shown in FIG. 2. The obtained photocured screen had a lattice pattern in well accordance with that of the negative film.

The amount of the uncured portions which had remained unremoved in the hollow portions of the light-shielding screen was determined as follows. The above-obtained light-shielding screen was cut taken on the line III—III of FIG. 2 to obtain a cross section as shown in FIG. 3. The cross-sectional area including the remaining uncured portion of a hollow portion and the cross-sectional area of the remaining uncured portion were determined by the microscopic method. The above-mentioned determination of the sectional areas was effected with respect to ten hollow portions. The percentage of the remaining uncured portions of each of the ten hollow portions was calculated by the following equation.

$$\text{Percentage of remaining uncured portions (\%)} = \frac{\left(\begin{array}{c}\text{Cross-sectional area of the remaining}\\ \text{uncured portion}\end{array}\right)}{\left(\begin{array}{c}\text{Cross-sectional area including the}\\ \text{remaining uncured portion}\end{array}\right)} \times 100$$

The amount of the remaining uncured portions was calculated by averaging the data obtained with respect to the ten hollow portions. As a result, it was found that the amount of the remaining uncured portions was zero, i.e., the uncured portions had been completely removed from the hollow portions of the modified layer.

Incidentally, in determining the sectional area of the hollow portions, the eveness in thickness-wise direction of the width of the hollow portion was also determined and found to be good.

The transmission of light rays emitted from a display through the light-shielding screen was determined with respect to ten sites (diameter of the opening of the measuring device: 1 mm) of the shielding screen using a densitometer DM-50 (manufactured and sold by DAINIPPON SCREEN MFG. CO., LTD). The percent light transmission of the ten sites of the shielding screen was in the range of 59 to 61%.

The screen was attached to a television set over its front panel, and subjected to visual tests with respect to the contrast and the occurrence of the ghost phenomenon. It was found that although the front panel was directly irradiated, there was scarcely any decrease in image contrast and no ghost phenomenon occurred. Further, clear pictures were obtained with no distortion and halation.

COMPARATIVE EXAMPLE 1

About 50 g of the same photocurable resin composition containing a delustering agent as used in Example 1 was poured onto a 20μ-thick polypropylene film superimposed on a 100μ-thick negative film having the same pattern as that used in Example 1, which negative film had been supported by a 10 mm-thick transparent glass plate. Onto the photocurable resin composition was placed a 3 mm-thick, 30 cm-wide and 30 cm-long transparent glass plate having its surface, to be contacted with the photocurable resin composition, treated with γ-methacryloxypropyl trimethoxysilane, the treatment being conducted by dipping the glass plate in 10% by weight ethanol solution of γ-methacryloxypropyl trimethoxysilane, and drying the glass plate at 100° C. for 30 minutes. The thickness of the photocurable resin composition layer was adjusted to 500μ with the use of a spacer of the same thickness. The resulting laminate assembly was exposed for about 80 seconds from the side of the negative film to actinic rays from a 3 KW ultra-high pressure mercury lamp placed at a distance of 50 cm from the surface of the laminate assembly, thereby causing the photocurable resin composition to be photocured in the lattice pattern. Thereafter, the glass plate supporting the negative film, the negative film and then the polypropylene film were stripped off. Over the photocured resin layer of the resulting assembly was sprayed a weakly alkaline solution (a 1% aqueous solution of sodium borate) heated to 50° C. from a nozzle placed at a distance of about 1 cm from the resin layer at a discharge pressure of 0.8 $kg/cm^2$-gauge and a discharge rate of about 20 liters/minute to wash away the non-exposed, non-photocured areas of the resin layer for 180 seconds. Thus, a photorelief plate was obtained. The so-obtained photorelief plate was treated in substantially the same manner as in Example 1 to obtain a light-shielding screen having a photocured lattice pattern resin portion and supported by the glass plate.

In substantially the same manner as in Examaple 1, the determination of the amount of the remaining non-exposed portion, light transmission measurement and visual tests were conducted. As a result, it was found that 10% of the non-exposed portion remained unremoved, and percent light transmission varied from 1% to 20%. Further, from the visual test, it was found that the brightness of the image from the display varied from portion to portion of the light shielding screen and that the image through the light-shielding screen were overall dim, obscure and distorted ones.

EXAMPLE 2

To 200 parts of polyethylene adipate (diol; average molecular weight, 2,000) were added 35 parts of tolylene diisocyanate and 0.5 parts of dibutyltin laurate and the mixture was allowed to react at 70° C. for 2 hours. Then, to the reactant was added 100 parts of an ethylene oxidepropylene oxide copolymer having an ethylene oxide content of 35% by weight (block copolymer diol: average molecular weight, 2000) and allowed to react at 70° C. for 2 hours to obtain a block copolymer having isocyanate groups at both terminals of the molecules thereof. 300 Parts of the above-obtained block copolymer was reacted with 25 parts of 2-hydroxyethyl methacrylate and 0.1 part of hydroquinone at 70° C. for 2 hours. 300 Parts of the resulting polymer, 75 parts of 2-hydroxypropyl methacrylate, 15 parts of 2-ethylhexyl acrylate, 30 parts of n-butyl acrylate and 6 parts of benzoin ethyl ether were mixed to obtain a photocurable resin composition.

Then, about 70 g of the photocurable resin composition was poured onto a 20μ-thick polypropylene film superimposed on a linear, in-parallel arranged lattice pattern negative film of 100 μ in thickness having 80μ-wide transparent portions and square opaque portions of 300μ in side length which negative film had been supported by a 10 mm-thick transparent glass plate. Onto the photocurable resin composition was placed a 500μ-thick, 30 cm-wide and 30 cm-long polyester film to be contacted with the photocurable resin composition, and the thickness of the photocurable resin composition layer was adjusted to 700μ with the use of a spacer of the same thickness. The resulting laminate assembly was exposed for about 70 seconds from the side of the negative film to actinic rays from a 3 KW ultra-high pressure mercury lamp placed at a distance of 50 cm from the surface of the laminte assembly, thereby causing the photocurable resin composition to be photocured in the striped pattern. Thereafter, the glass plate supporting the negative film, the negative film, the polypropylene film and the polyester film were stripped off. In substantially the same manner as in Example 1, the so-obtained resin composition layer was developed, rinsed with water, post-irradiated, dyed, rinsed again with water and redried to obtain a reflection preventive light-shielding screen through which lattice pattern fine hollow portions were formed. From the transmission measurement, the percent light transmissions were within the range of 57 to 59%.

The screen was attached to a display panel of a computer, and subjected to visual tests. It was found that the light-shielding screen had a glare-preventing effect and that the image on the display were clear and sharp through the light-shielding screen without occurrence of any ghost phenomenon.

What is claimed is:

1. A light-shielding screen produced by the process which comprises:

(a) providing a self-supporting resin composition layer;

(b) image-wise exposing the photocurable resin composition layer to actinic radiation through an image-bearing transparency to convert the photocurable resin composition layer to a modified layer having photocured image portions and a plurality of remaining uncured portions, each of said uncured portions extending from one surface of the layer to the other surface of the layer; and (c) applying a developer to said modified layer to remove said uncured portions, thereby forming hollow portions passing through said modified layer, said hollow portions having their respective upper and lower openings, said upper openings being arranged in coplanar relationship on one surface of said modified layer and said lower openings being arranged in coplanar relationship on the other surface of said modified layer, each hollow portion having an inner wall extending from the circumference of the lower opening substantially parallel with the axis of said hollow portion, said axis being defined by an imaginary straight line extending from the center of the upper opening to the center of the lower opening.

2. A light-shielding screen produced by the process which comprises (a) providing a photocurable resin composition layer which is superimposed on a substrate;

(b) image-wise exposing the photocurable resin composition layer to actinic radiation through an image-bearing transparency to convert the photocurable resin composition layer to a modified layer having photocured image portions and a plurality of remaining uncured portions, each of said uncured portions extending from one surface of the layer to the other surface of the layer; and (c) removing said substrate; and (d) applying a developer to said modified layer to remove said uncured portions, thereby forming hollow portions passing through said modified layer, said hollow portions having their respective upper and lower openings, said upper openings being arranged in coplanar relationship on one surface of said modified layer and said lower openings being arranged in coplanar relationship on the other surface of said modified layer, each hollow portion having an inner wall extending from the circumference of the lower opening substantially parallel with the axis of said hollow portion, said axis being defined by an imaginary straight line extending from the center of the upper opening to the center of the lower opening.

3. A light-shielding screen according to claim 2, wherein said photocurable resin composition contains a delustering agent.

4. A light-shielding screen according to claim 2, wherein said photocurable resin composition is a photopolymerizable resin composition.

5. A light-shielding screen according to claim 4, wherein said photopolymerizable resin composition comprises a compound having an addition polymerizable ethylenically unsaturated group and a photopolymerization initiator, said compound being at least one member selected from the group consisting of prepolymers and monomers.

6. A light-shielding screen according to claim 1, wherein said photocurable resin composition contains a dye or a pigment.

7. A light-shielding screen according to claim 1, which further comprises, after step (c), dying at least the inner wall of each of the hollow portions.

8. The light shielding screen of claim 2, wherein the width of the openings is in the range of 0.01 to 3 mm.

9. The light shielding screen of claim 2, wherein the ratio of the width of the openings to the photocured resin composition layer varies from 1:0.2 to 1:5.

10. The light shielding screen of claim 2, wherein the inner wall of each of the hollow portions has a roughened surface.

11. The light shielding screen of claim 2, wherein the photocured resin composition contains 0.1 to 20% by weight of a delustering agent based on the photocured resin composition.

12. The light shielding screen of claim 2, wherein the photocurable resins are prepared from prepolymers selected from the group consisting of unsaturated polyesters, alkyd resins, unsaturated polyurethanes, and oligomers of ester-acrylates.

13. A light-shielding screen produced by the process which comprises:

(a) providing a photocurable resin composition layer which is superimposed on a substrate;

(b) image-wise exposing the photocurable resin composition layer to actinic radiation through an image-bearing transparency to convert the photocurable resin composition layer to a modified layer having photocured image portions and a plurality of remaining uncured portions, each of said uncured portions extending from one surface of the layer to the other surface of the layer; and (c) applying a developer which consists essentially of a liquid capable of washing away both the uncured resin composition portions and the substrate, thereby forming hollow portions passing through said modified layer, said hollow portions having their respective upper and lower openings, said upper openings being arranged in coplanar relationship on one surface of said modified layer and said lower openings being arranged in coplanar relationship on the other surface of said modified layer, each hollow portion having an inner wall extending from the circumference of the lower opening substantially parallel with the axis of said hollow portion, said axis being defined by an imaginary straight line extending from the center of the upper opening to the center of the lower opening.

* * * * *